Sept. 8, 1970     H. WARNER     3,526,913
BEE FEEDERS
Filed May 24, 1968     2 Sheets-Sheet 1
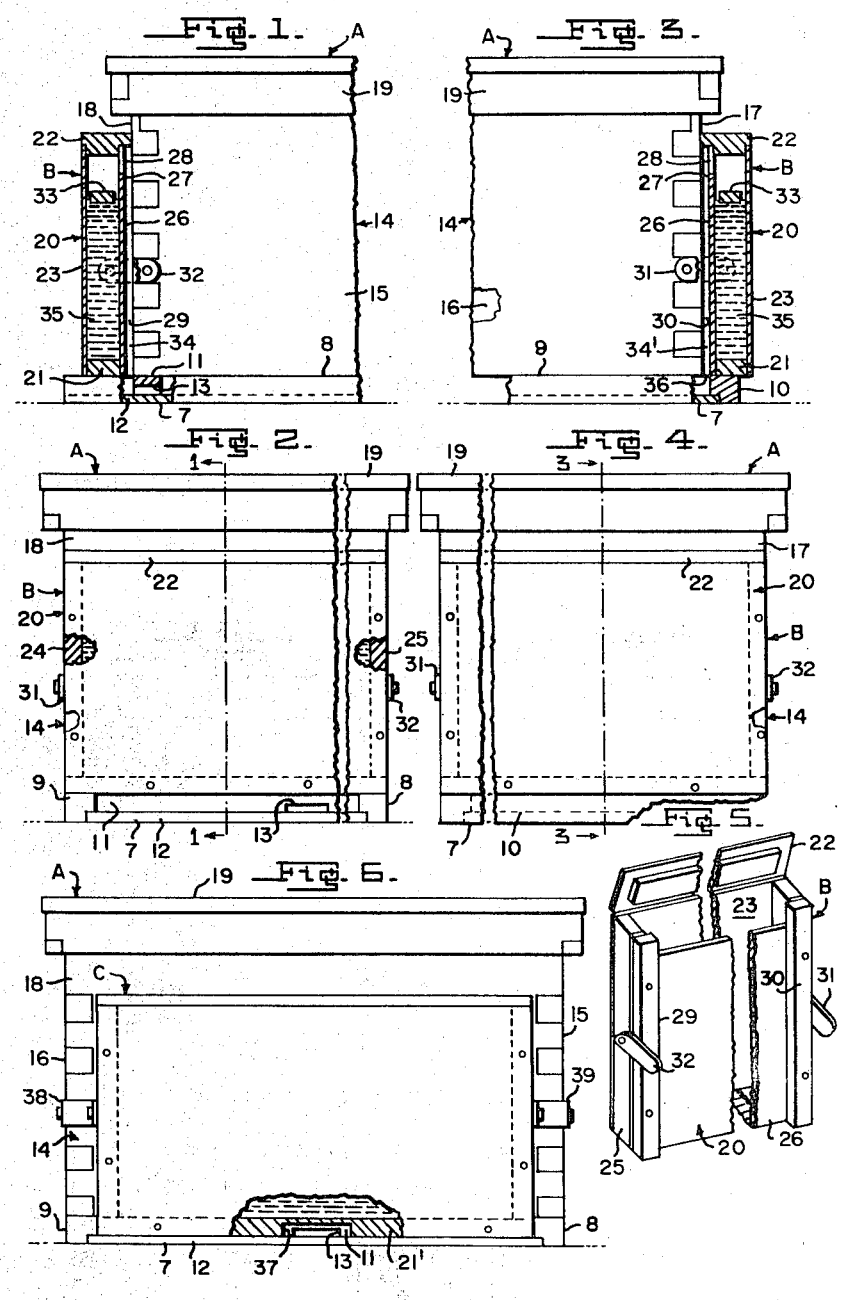
INVENTOR.
HERMAN WARNER
By
ATTORNEY

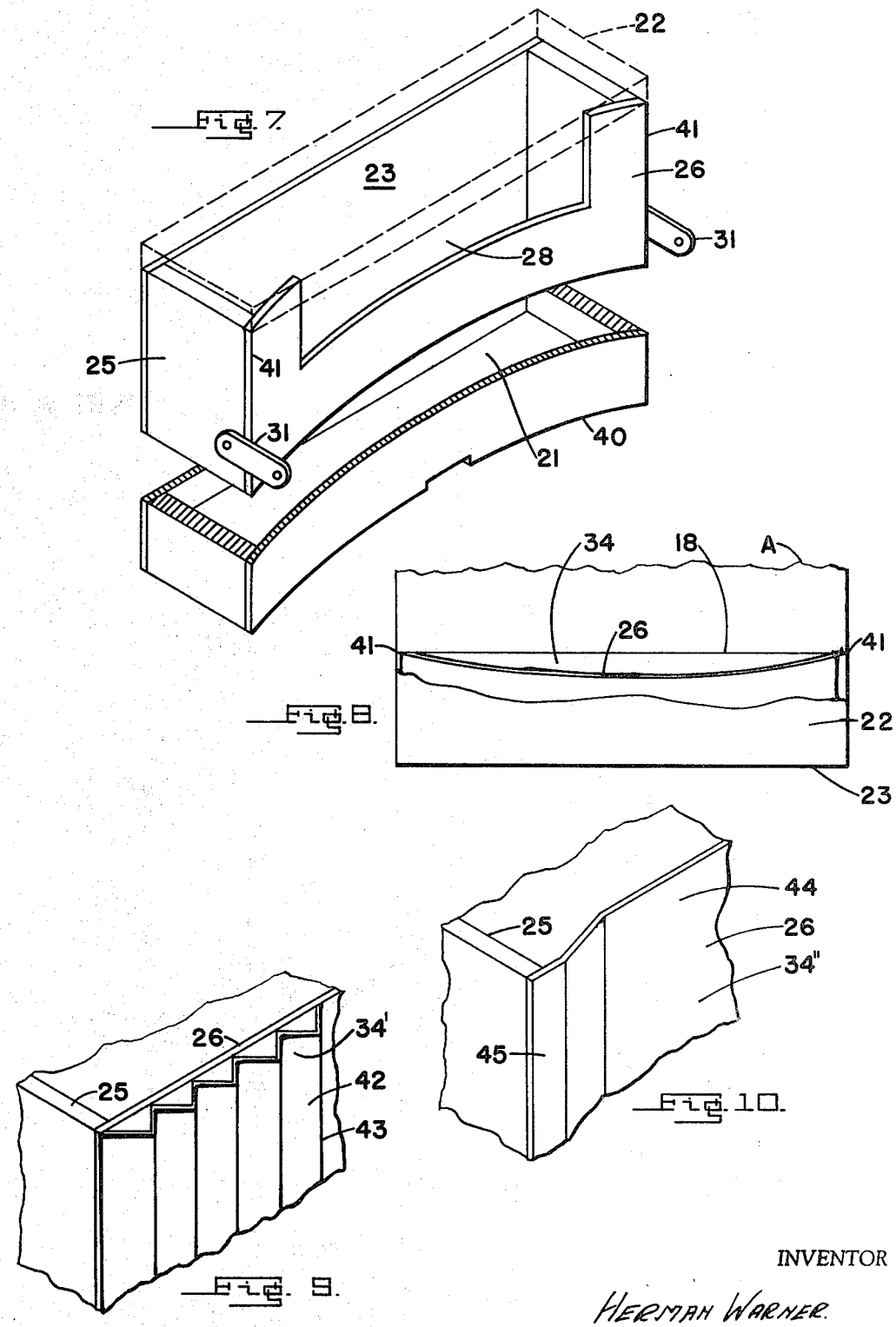

United States Patent Office 3,526,913
Patented Sept. 8, 1970

3,526,913
BEE FEEDERS
Herman Warner, P.O. Box 64, Matlock,
Manitoba, Canada
Filed May 24, 1968, Ser. No. 731,867
Int. Cl. A01k 53/00
U.S. Cl. 6—5                                   13 Claims

ABSTRACT OF THE DISCLOSURE

A bee feeder consisting of a vertical situated shallow box attachable to the front or rear of the hive and having an inner panel which provides a bee passageway from the base of the feeder to the entrance of the feeder adjacent the upper end thereof and a float bar which permits the bees access to the contents of the feeder, but without immersion.

My invention relates to new and useful improvements in bee feeders and consists of a shallow vertically situated box having a removable cover and attachable to the front or rear wall of a hive. The back wall of the box terminates short of the cover thus defining a bee entrance to the feeder and bee passageways are formed between the rear wall of the feeder and the hive wall thus permitting bees access from the base of the feeder to the entrance thereof.

An important object of my invention is to provide a bee feeder so constructed and attached to a conventional beehive that the contents of the bee feeder are readily accessible to bees within the hives and the bee feeder may be serviced and refilled with feed or water from the outside without disturbing or opening the beehive.

A further object of my invention is the provision of a bee feeder so constructed that it may be attached to the back wall of a conventional hive body without cutting or otherwise modifying the hive body back wall and, when so attached no robber bees can be found entering the feeder without first entering the hive.

My invention also aims to provide a bee feeder so constructed that it may be attached either to the front wall or to the back wall of a conventional hive body.

My invention further aims to provide a bee feeder which may be attached to a conventional beehive in early spring and left on as long as necessary, or left on all the time if desired.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregong herein particularly exemplified in one or more specific emobdiments of such concept, reference being had to the accompanying figures in which:

FIG. 1 is a fragmentary view, partly in side elevation and partly in vertical cross section, of a conventional ventional beehive having my bee feeder attached thereto, the sectional showing of the the preferred form of my bee feeder being substantially on the line 1—1 of FIG. 2.

FIG. 2 is a fragmentary view, partly in front elevation and partly in vertical cross section, of a conventional beehive having the preferred form of my bee feeder attached thereto.

FIG. 3 is a fragmentary view, partly in side elevation and partly in vertical section of the back end of a beehive having the preferred form of my bee feeder attached therto, the sectional parts of the bee feeder being substantially on the line 3—3 of FIG. 4.

FIG. 4 is a fragementary view of rear elevation of a conventional beehive having the preferred form of my bee feeder attached thereto.

FIG. 5 is a fragmentary prespective view of the preferred form of my bee feeder, looking toward same from the back thereof and showing the cover partially removed.

FIG. 6 is a view partly in front elevation and partly in vertical cross section of a conventional beehive equipped with a modified form of my bee feeder.

FIG. 7 is an isometric view of a further embodiment of the feeder.

FIG. 8 is a top plan view of FIG. 7.

FIG. 9 is a fragmentary isometric view of a further embodiment of the device.

FIG. 10 is a fragmentary isometric view of a still further embodiment of the device.

In the drawings like characters of reference indicate corresponding parts in the different figures.

Proceeding therefore to describe my invention in detail, reference should be made to the accompanying drawings in which the latter A generally designates a beehive, B my preferred form of bee feeder and C a modified form of bee feeder.

The beehive A is of conventional construction in that it includes a bottom board 7 provided with right and left raised marginal side ribs 8, 9, a raised marginal back rib 10, and a forward cross rib 11 disposed inwardly of the front end portion 12 of the bottom board 7. The detached forward cross rib entrance reducer 11 is notched to provide a bee entrance opening 13. Mounted on the bottom board 7 is a hive body 14 resting on the right and left side ribs 8, 9 of the bottom board 7, a back 17 normally resting on the back rib 10 of the bottom board 7, and a front 18 normally resting on the forward cross rib 11 of the bottom board 7. With the just-described arrangement, the front end portion 12 of the bottom board 7 projects forwardly of the hive body 14 and by moving the entrance reducer away from the hive body, an opening is invented for the bees to enter the feeder. In the example shown, the hive body 14 is surmounted by an outer cover or roof 19, but it will be understood that the beehive A may include additional parts between the hive body 14 and a roof 19 if desired.

Referring now to my preferred form of bee feeder B, the same comprises a long, narrow box 20 including a floor strip 21 and a removable cover 22, as well as a front wall 23, left and right end walls 24, 25 and a back wall 26 terminating in a top edge 27 below the top edges of the front and end walls 23–25 of the box 20 thereby forming a long narrow bee access opening 28 at the rear upper portion of the box 20 below the cover 22. The box 20 may be formed of any suitable material such as wood, plastic, masonite, metal or, plywood, the latter being quite suitable material for the relatively thin front and back walls 23, 26 of the box 20. Nailed to the side margins of the back wall 26 of the box 20 are spaced upright strips 29, 30 which project rearwardly from the back wall 26 of the box 20. I make the bee feeder B of a length equal to the width of the hive body 14, thus making it convenient to rest the box floor 21 on the right and left raised marginal side ribs 8, 9 and fasten the bee feeder B against the hive body front 18 by nailing strips 31, 32 as shown in FIG. 1 and FIG. 2 of the drawing. I prefer that the box 20 be made narrow enough to leave part of the front end portion 12 of the bottom board 7 projecting forwardly of the hive body 14 with bee feeder B fastened to its front 18. I also prefer to make the height of the box 20 somewhat less than that of the hive body 14 so as to leave space for manipulation of the removable cover 22. The bee feeder B also includes a float 33 formed of a strip of wood or other suitable material. With the bee feeder B fastened to the front 18 of the hive body 14 as shown in FIGS. 1 and 2, bees may alight on the forwardly projecting front end portion 12 of the bottom board 7, enter hive 14 through the entrance opening 11, or travel upwardly along the space 34 defined by the hive body front 18, the back wall 26 of the bee feeder box 20, and the spaced upright strips 29, 30, this space 34 extending upwardly from the bottom board 7 and communicating with the bee access opening 28 into the box 20. Upon entering the top of the box 20, the bees may alight on the float 33 which prevents immersion of bees in the syrup 35 or other feed material.

Referring now to the arrangement of bee feeder B shown in FIGS. 3 and 4, the back 17 of the hive body 14 which normally rests on the raised marginal back rib 10 of the bottom board 7 is shifted forwardly by adjustment of the hive body 14 on the side ribs 8, 9 of the bottom board 7 so as to provide a long narrow slot 36 between the back 17 of the hive body 14 and the raised marginal back rib 10.

This arrangement permits resting the box floor 21 on the raised marginal back rib 10 and fastening of the box 20 against the hive body back 17 by means of the nailing strips 31, 32. With this arrangement of parts, bees within the hive 14 may travel upwardly along the space 34' defined by the back 17 of the hive body 14, the back wall 26 of the box 20 and the spaced upright strips 29, 30. The bees may then enter the box-top through the bee access opening 28 and alight on the float 33 resting on the syrup 35 or other food material.

Referring now to my modified form of bee feeder C, as shown in FIG. 6, the same differs from the previously described bee feeder B in that it is shorter in length so that it may fit between the raised marginal side ribs 8, 9 and thereby rest directly on the bottom board 7 itself. Consequently, the floor 21' of the bee feeder C is notched to provide a bee entrance opening 37 aligning with the entrance opening 13 that already exists in the raised forward cross rib 11 of the bottom board 7. With this arrangement, bees may alight on the projecting front end portion 12 of the bottom board 7, enter the opening 37 in the box floor 21', enter the hive 14 through the existing opening 13 of the hive or, inasmuch as the remaining parts of the bee feeder C are like those of the bee feeder B, travel upwardly along the previously described space between the rearwardly projecting upright strips 29, 30. The fastening strips 38, 39 shown in FIG. 6 may be somewhat longer than the previously described fastening strips 31, 32 due to the need for bending because of the difference in length of the bee feeder C and the width of the hive body 14.

FIGS. 7 to 10 inclusive show alternate methods of construction, but inasmuch as the majority of the construction is similar to that hereinbefore described, similar reference characters have been used.

FIG. 7 shows the feeder including the sides 25, front wall 23, and rear wall 26 together with base 21. The rear edge 40 of the base is concavedly curved and the rear wall 26 is secured to this concavedly curved edge thus deflecting the rear wall in an arcuate curve between the ends thereof as clearly shown. This means that when the feeder is secured to the hive wall 18, the bee access space 34 is defined by the arcuately curved rear wall 26 and the hive wall 18, the ends or edges 41 engaging the hive wall 18 and acting in a way similar to the strips 29 and 30.

FIG. 9 shows an alternative embodiment in which a vertically corrugated panel 42 is either secured to the rear wall 26 or forms the rear wall of the feeder. The apieces 43 of the corrugations engage the wall 18 of the hive so that the vertical bee access grove 34' are defined.

FIG. 10 shows a still further method of construction in which the rear wall 26 of the feeder is deformed inwardly as at 44 between the ends 45 thereof hereagain defining a vertical access area 34", the ends 45 engaging the wall 18 of the hive.

The foregoing are only some of the varying methods of construction which may be utilized depending upon circumstances.

Various modifications can be made within the scope of the inventive concept disclosed. Accordingly it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. A bee feeder for an outside wall of a beehive, said bee feeder comprising in combination a detachable cover, a front wall, end walls, a base wall, and a rear wall, bee entrance means formed through said rear wall adjacent the upper edge thereof and below said cover and bee access means on said rear wall extending from said base wall to said bee entrance means.

2. In a beehive including a bottom board having a raised forward cross rib disposed inwardly of the front end portion of the bottom board, said cross rib being provided with a bee entrance opening, and a hive body having a front resting on the front rib whereby the front end portion of the bottom board projects forwardly of the hive body, a bee feeder comprising a box including a removable cover, a front wall, end walls, a base wall, and a back wall terminating in a top edge below the top edges of the front and end walls of the box and thereby forming a bee entrance opening into the box, and bee access means on said rear wall extending from said base wall to said bee entrance.

3. In a beehive as defined in claim 2, said bottom board having raised marginal side ribs on which said bee feeder rests in elevated spaced relation to the front end portion of the bottom board.

4. In a beehive as defined in claim 2, said bee feeder resting directly on said bottom board and having a floor provided with a bee entrance notch aligning with the bee entrance opening into the beehive.

5. In a beehive of the type which includes a bottom board having raised marginal side ribs, a raised marginal back rib, a raised forward cross rib disposed inwardly of the front end portion of the bottom board, said cross rib being provided with a bee entrance opening, and a hive body having sides resting on said side ribs, a back normally resting on said back rib but shiftable forwardly into a position wherein a slot is formed between the back and the back rib for the passage of bees, a bee feeder comprising a box including a removable cover, a front wall, end walls, a base wall, and a back wall terminating in a top edge below the top edges of the front and end walls of the box thereby forming a bee entrance opening into said box below said cover, and bee access means on said rear wall extending from said base wall to said bee entrance opening.

6. A bee feeder for an outside wall of a beehive, said bee feeder including a removable cover, a front wall, end walls and a back wall terminating in a top edge below the top edges of the front and end walls of the box thereby forming a rear opening into the box, said back wall having spaced upright strips projecting from its opposite side margins, said bee feeder being attachable to said outside wall with said spaced upright strips disposed against said outside wall thereby forming a vertical bee passageway communicating with the rear opening into the box.

7. In a beehive including a bottom board having a raised forward cross rib disposed inwardly of the front end portion of the bottom board, said cross rib being provided with a bee entrance opening, and a hive body having a front resting on the front rib whereby the front end portion of the bottom board projects forwardly of the hive body, a bee feeder comprising a box including a removable cover, a front wall, end walls and a back wall terminating in a top edge below the top edges of the front and end walls of the box and thereby forming a bee access opening into the box, said back wall having spaced upright strips projecting from its opposite side margins, means attaching the box to the front of the hive body with said spaced upright strips disposed against said hive body front thereby forming a vertical bee passageway between the bottom board and the bee access opening into the box.

8. In a beehive of the type which includes a bottom board having raised marginal side ribs, a raised marginal back rib, a raised forward cross rib disposed inwardly of the front end portion of the bottom board, said cross rib being provided with a bee entrance opening, and a hive body having sides resting on said side ribs, a back normally resting on said back rib but shiftable forwardly into a position wherein a slot is formed between the back and the back rib for the passage of bees, a bee feeder comprising a box including a removable cover, a front wall, end walls and a back wall terminating in a top edge below the top edges of the front and end walls of the box thereby forming a bee access opening into the box below said cover, said back wall having spaced upright strips projecting from its opposite side margins, said box being attached to said hive body back in its forwardly shifted position and being seated on said back rib whereby a bee passageway is formed between the hive back and the back wall of the feeder and which extends from said slot to said access opening.

9. The feeder described in claim 1 in which the rear edge of said base wall is concave, said rear wall being secured to said concave rear edge and also being concave, the sides of said side walls being disposed against said outside wall of said hive whereby the concavity of said rear wall forms said bee access means in conjunction with said outside wall.

10. The feeder described in claim 2 in which the rear edge of said base wall is concave, said rear wall being secured to said concave rear edge and also being concave, the sides of said side walls being disposed against said hive body whereby the concavity of said rear wall forms said bee access means in conjunction with said hive body.

11. The feeder described in claim 3 in which the rear edge of said base wall is concave, said rear wall being secured to said concave rear edge and also being concave, the sides of said side walls being disposed against said hive body whereby the concavity of said rear wall forms said bee access means in conjunction with said hive body.

12. The feeder described in claim 4 in which the rear edge of said base wall is concave, said rear wall being secured to said concave rear edge and also being concave, the sides of said side walls being disposed against said hive body whereby the concavity of said rear wall forms said bee access means in conjunction with said hive body.

13. The feeder described in claim 5 in which the rear edge of said base wall is concave, said rear wall being secured to said concave rear edge and also being concave, the sides of said side walls being disposed against said hive body whereby the concavity of said rear wall forms said bee access means in conjunction with said hive body.

References Cited

UNITED STATES PATENTS

| | | | |
|---|---|---|---|
| 669,371 | 3/1901 | Pullins | 6—5 |
| 905,706 | 12/1908 | Johnson | 6—5 |
| 2,522,511 | 9/1950 | Hageman | 6—1 |

FOREIGN PATENTS

| | | |
|---|---|---|
| 58,838 | 2/1912 | Switzerland. |

LUCIE H. LAUDENSLAGER, Primary Examiner